United States Patent
Hirano

(10) Patent No.: US 9,811,768 B2
(45) Date of Patent: Nov. 7, 2017

(54) PROFILE CREATION METHOD AND COMPUTER READABLE RECORDING MEDIUM STORED WITH PROFILE CREATION PROGRAM

(71) Applicant: Konica Minolta, Inc., Chiyoda-ku, Tokyo (JP)

(72) Inventor: Sachiko Hirano, Hino (JP)

(73) Assignee: KONICA MINOLTA, INC., Chiyoda-ku, Tokyo (JP)

(*) Notice: Subject to any disclaimer, the term of this patent is extended or adjusted under 35 U.S.C. 154(b) by 35 days.

(21) Appl. No.: 14/729,129

(22) Filed: Jun. 3, 2015

(65) Prior Publication Data

US 2015/0356387 A1 Dec. 10, 2015

(30) Foreign Application Priority Data

Jun. 6, 2014 (JP) .................................. 2014-117737

(51) Int. Cl.
- *G06F 15/00* (2006.01)
- *G06K 1/00* (2006.01)
- *G06K 15/02* (2006.01)
- *H04N 1/60* (2006.01)

(52) U.S. Cl.
CPC ....... *G06K 15/1878* (2013.01); *H04N 1/6036* (2013.01); *H04N 1/6055* (2013.01)

(58) Field of Classification Search
None
See application file for complete search history.

(56) References Cited

U.S. PATENT DOCUMENTS

| 2004/0190022 A1* | 9/2004 | Kiyohara | ............. | H04N 1/6055 358/1.9 |
| 2006/0139479 A1* | 6/2006 | Dicarlo | ................ | H04N 1/6033 348/370 |
| 2012/0200867 A1* | 8/2012 | Fujita | ................... | H04N 1/6033 358/1.9 |

FOREIGN PATENT DOCUMENTS

| JP | 2001-320592 | 11/2001 |
| JP | 2008-244814 | 10/2008 |
| JP | 2012-205249 A | 10/2012 |

OTHER PUBLICATIONS

Extended European Search Report issued in corresponding European Patent Application No. 15169300.9-1902, dated Oct. 27, 2015 (5 pages).

* cited by examiner

*Primary Examiner* — Vincent Rudolph
*Assistant Examiner* — Michael Burleson
(74) *Attorney, Agent, or Firm* — Buchanan Ingersoll & Rooney PC

(57) ABSTRACT

The profile creation method creates a color conversion profile for a printer by causing the printer to output a color chart including patch images having colors corresponding to combinations of values of a plurality of basic colors. The method includes acquiring colorimetric values of the patch images included in the color chart output from the printer; creating a color conversion profile from the acquired colorimetric values by using a calculation formula according to a degree of variation in a color of each patch image obtained from data of colorimetric values accumulated regarding the each patch image; and when the data of the colorimetric values increases by a predetermined amount, creating a new color conversion profile from the acquired colorimetric values by using a calculation formula according to the degree of the variation obtained from the data after the increase.

24 Claims, 12 Drawing Sheets

FIG.13

| M (Y20%, K0%) | | | | | | | | | | |
|---|---|---|---|---|---|---|---|---|---|---|
| 100% | COLORIMETRIC VALUE ACQUIRED | COLORIMETRIC VALUE ACQUIRED | | COLORIMETRIC VALUE ACQUIRED | | COLORIMETRIC VALUE ACQUIRED | | COLORIMETRIC VALUE ACQUIRED | | COLORIMETRIC VALUE ACQUIRED |
| 85% | | | | | | | | | | |
| 70% | COLORIMETRIC VALUE ACQUIRED | | | COLORIMETRIC VALUE ACQUIRED | | COLORIMETRIC VALUE ACQUIRED | | COLORIMETRIC VALUE ACQUIRED | | COLORIMETRIC VALUE ACQUIRED |
| 55% | | | | | | | | | | |
| 40% | COLORIMETRIC VALUE ACQUIRED | COLORIMETRIC VALUE ACQUIRED | | COLORIMETRIC VALUE ACQUIRED | | COLORIMETRIC VALUE ACQUIRED | | COLORIMETRIC VALUE ACQUIRED | | COLORIMETRIC VALUE ACQUIRED |
| 30% | | | | | | | | | | |
| 20% | COLORIMETRIC VALUE ACQUIRED | COLORIMETRIC VALUE ACQUIRED | | COLORIMETRIC VALUE ACQUIRED | | COLORIMETRIC VALUE ACQUIRED | | COLORIMETRIC VALUE ACQUIRED | | COLORIMETRIC VALUE ACQUIRED |
| 10% | COLORIMETRIC VALUE ACQUIRED | COLORIMETRIC VALUE ACQUIRED | | COLORIMETRIC VALUE ACQUIRED | | COLORIMETRIC VALUE ACQUIRED | | COLORIMETRIC VALUE ACQUIRED | | COLORIMETRIC VALUE ACQUIRED |
| 0% | COLORIMETRIC VALUE ACQUIRED | COLORIMETRIC VALUE ACQUIRED | | COLORIMETRIC VALUE ACQUIRED | | COLORIMETRIC VALUE ACQUIRED | | COLORIMETRIC VALUE ACQUIRED | | COLORIMETRIC VALUE ACQUIRED |
| | 0% | 10% | 20% | 30% | 40% | 55% | 70% | 85% | 100% | C |

PROFILE CREATION METHOD AND COMPUTER READABLE RECORDING MEDIUM STORED WITH PROFILE CREATION PROGRAM

CROSS-REFERENCE TO RELATED APPLICATION

This application is based on Japanese Patent Application No. 2014-117737 filed on Jun. 6, 2014, the contents of which are incorporated herein by reference.

BACKGROUND

1. Technical Field

The present invention relates to a profile creation method and a computer readable recording medium stored with a profile creation program.

2. Description of Related Art

In creating a printer profile for an electro-photographic printer, the printer is caused to output a color chart that includes patch images having colors corresponding to combinations of values of C (cyan), M (magenta), Y (yellow), and K (black). Then, the patch images included in the color chart are colorimetrically measured to correlate CMYK values of each patch image with colorimetric values (such as L*a*b* values) thereof, thereby creating a printer profile.

Meanwhile, colors output from a printer have small variation. For example, colors output from a single printer slightly vary per output even in colors with the same CMYK values. In addition, colors output from a plurality of printers slightly vary per printer even in colors with the same CMYK values output from the printers of the same model. The degree of such a color variation per output or per printer varies depending on output color.

Accordingly, there is a concern that when a printer profile is created on the basis of one sheet of a color chart output by a printer, color variation is picked up, thus creating a rather inappropriate printer profile.

With regard to this, Japanese Unexamined Patent Application Publication No. 2012-205249 discloses a technique in which profiles are accumulated and when the number of the profiles exceeds a predetermined number, an average profile of the accumulated profiles is calculated. This technique allows an average value (a median value) of color variation to be reflected in a profile, thus allowing the creation of an appropriate printer profile in consideration of color variation.

However, it is not necessarily certain that a printer profile created by averaging a plurality of profiles accurately reflects an average value of color variation. For example, in creating a printer profile by averaging only about a few profiles, if an abnormal profile is included in the only a few profiles, a created profile will not accurately reflect an average value of color variation, which is unfavorable.

SUMMARY

The present invention has been accomplished in view of the above problem. Accordingly, objectives of the present invention are to provide a profile creation method that can create a color conversion profile more accurately reflecting an average value of color variation and a computer readable recording medium stored with a profile creation program.

To achieve at least one of the above-mentioned objectives, a profile creation method reflecting one aspect of the present invention is a profile creation method for creating a color conversion profile for a printer by causing the printer to output a color chart including patch images having colors corresponding to combinations of values of a plurality of basic colors, the method comprising the steps of: (a) acquiring colorimetric values of the patch images included in the color chart output from the printer; (b) creating a color conversion profile from the colorimetric values acquired at the step (a) by using a calculation formula according to a degree of variation in a color of each patch image obtained from data of colorimetric values accumulated regarding the each patch image; and (c) when the data of the colorimetric values increases by a predetermined amount, creating a new color conversion profile from the colorimetric values acquired at the step (a) by using a calculation formula according to the degree of the variation obtained from the data after the increase.

Preferably, the profile creation method further comprises the step of: (d) replacing the color conversion profile created at the step (b) by the new color conversion profile created at the step (c).

Preferably, the profile creation method further comprises the step of: (e) when the data of the colorimetric values increases by a predetermined amount, comparing degrees of the variation before and after the increase to determine whether or not to execute the step (c).

In the profile creation method, preferably, the calculation formula includes a calculation formula for correcting the colorimetric values acquired at the step (a).

In the profile creation method, preferably, the calculation formula is a calculation formula for calculating a weighted average value between a colorimetric value acquired at the step (a) and a predicted approximate value calculated from colorimetric values of a plurality of other patch images included in the color chart; and a weighting factor for use in the calculation of the weighted average value is changed according to the degree of the variation so that as the degree of the variation is larger, a weight of the predicted approximate value becomes larger.

In the profile creation method, preferably, a number of the other patch images is changed according to the degree of the variation so that as the degree of the variation is larger, the number of the other patch images increases.

In the profile creation method, preferably, the calculation formula includes a calculation formula for interpolating grid points of a lookup table indicating a correspondence relationship between the values of the colors of the patch images and the colorimetric values of the patch images.

In the profile creation method, preferably, the calculation formula is a calculation formula for performing an interpolation calculation using a plurality of grid points; and a number of the grid points for use in the interpolation calculation is changed according to the degree of the variation so that as the degree of the variation is larger, the number of the grid points increases.

In the profile creation method, preferably, the calculation formula is a calculation formula for calculating a weighted average value between a linear approximate value calculated by a linear interpolation calculation using a plurality of grid points and a polynomial approximate value calculated by a polynomial interpolation calculation using the plurality of grid points; and a weighting factor for use in the calculation of the weighted average value is changed according to the degree of the variation so that as the degree of the variation is larger, a weight of the linear approximate value becomes larger.

Preferably, the profile creation method further comprises the steps of: (f) calculating standard deviations of L* value, a* value, and b* value of the colorimetric value in an L*a*b* color system from the data of the colorimetric values; and (g) obtaining the degree of the variation on the basis of the standard deviations calculated at the step (f).

In the profile creation method, preferably, the data of the colorimetric values is classified into a plurality of categories on the basis of specific attribute information; the attribute information is added to the colorimetric values acquired at the step (a); and the degree of the variation is obtained from the data belonging to the same category as a category to which the attribute information added to the colorimetric values belongs.

In the profile creation method, preferably, the data of the colorimetric values is accumulated in a cloud server on a network.

The objectives, features, and characteristics of this invention other than those set forth above will become apparent from the description given herein below with reference to preferred embodiments illustrated in the accompanying drawings.

BRIEF DESCRIPTION OF THE DRAWINGS

FIG. 13 is a diagram for illustrating an interpolation process of grid points.

DETAILED DESCRIPTION

Hereinafter, preferred embodiments of the present invention will be described in detail with reference to the accompanying drawings.

Figure 1:
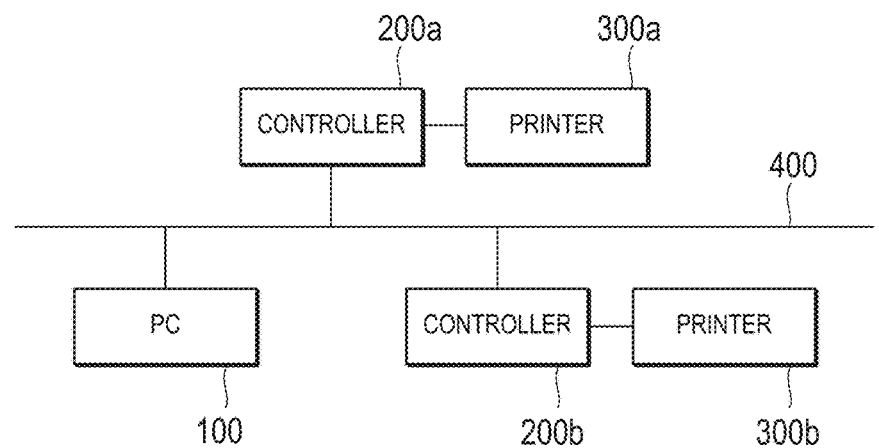
FIG. 1 is a block diagram showing a whole structure of a print system to which a profile creation method according to an embodiment of the present invention is applied.

FIG. 1 is a block diagram showing a whole structure of a print system to which a profile creation method according to an embodiment of the present invention is applied.

As shown in FIG. 1, the print system includes a PC (personal computer) 100, controllers 200a and 200b, and printers 300a and 300b. The PC 100 is communicably connected to the controllers 200a and 200b via a network 400. The controllers 200a and 200b, respectively, are connected to the printers 300a and 300b, respectively, for example, via an exclusive interface bus such as an IEEE 1394 serial bus or a USB (universal serial bus). The controllers 200a and 200b are controllers of the same model, and also the printers 300a and 300b are printers of the same model.

The network 400 is a LAN (local area network) connecting computers or network devices to each other by a standard such as Ethernet, FDDI (fiber distributed data interface), or Wi-Fi (wireless fidelity), a WAN (wide area network) connecting LANs to each other by an exclusive line, or the like. The kinds and numbers of the devices connected to the network 400 are not limited to those in the example shown in FIG. 1.

Figure 2:
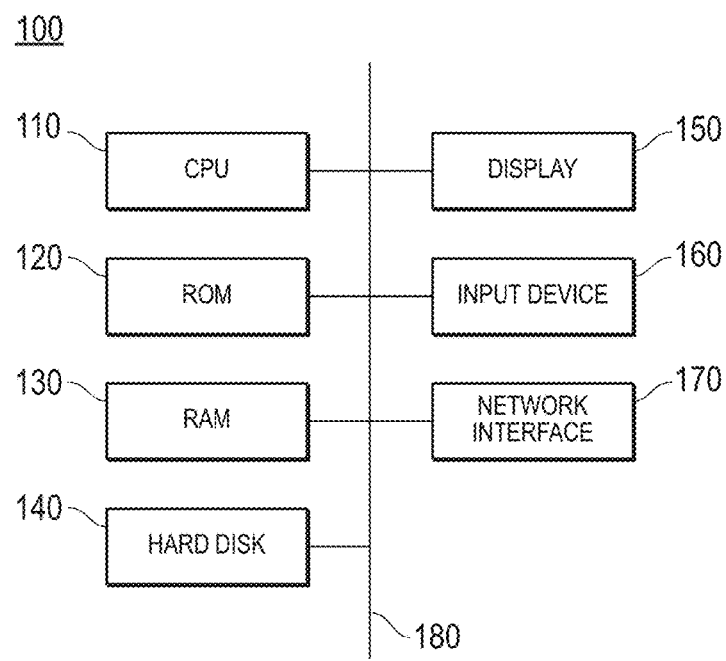
FIG. 2 is a block diagram showing a schematic structure of a PC.

FIG. 2 is a block diagram showing a schematic structure of the PC 100. The PC 100 includes a CPU (central processing unit) 110, a ROM (read only memory) 120, a RAM (random access memory) 130, a hard disk 140, a display 150, an input device 160, and a network interface 170, which are connected to each other via a bus 180 for receiving and transmitting signals.

The CPU 110 controls the above respective units and performs various kinds of calculation processes according to programs. The ROM 120 stores various kinds of programs and various kinds of data. The RAM 130 as a work area temporarily stores a program and data. The hard disk 140 stores various kinds of programs including an operating system (OS) and various kinds of data.

The display 150 is, for example, a liquid crystal display and displays various kinds of information. The input device 160 includes a pointing device such as a mouse and a keyboard and is used to perform various kinds of inputting operations. The network interface 170 is an interface for communicating with other devices via the network 400, and a standard such as Ethernet, FDDI, or Wi-Fi is used.

Figure 3:
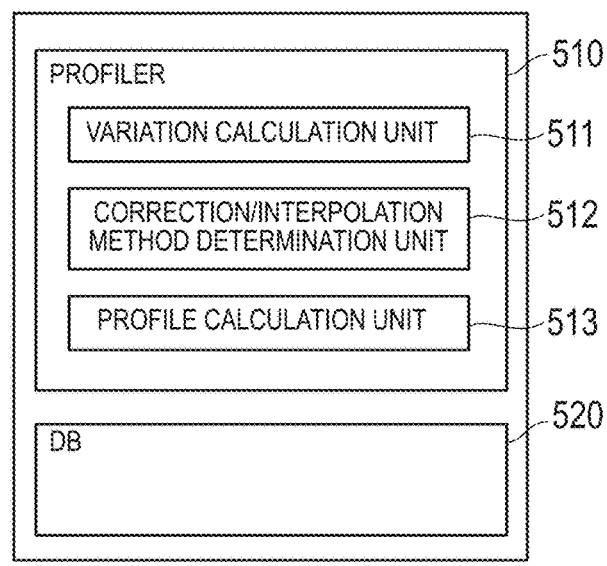
FIG. 3 is a block diagram showing storage contents of a hard disk of the PC.

FIG. 3 is a block diagram showing storage contents of the hard disk 140 of the PC 100.

The hard disk 140 of the PC 100 stores a profiler 510 as a profile creation program. In addition, the hard disk 140 is provided with a DB (data base) 520 as a data storage area.

The profiler 510 includes programs corresponding to a variation calculation unit 511, a correction/interpolation method determination unit 512, and a profile calculation unit 513.

Herein, the variation calculation unit 511 calculates a degree of color variation in each patch image from data of colorimetric values accumulated regarding the each patch image. The correction/interpolation method determination unit 512 determines a correction/interpolation calculation method (calculation formulas) for use in the creation of a printer profile according to the degree of color variation. The profile calculation unit 513 creates a printer profile by correcting the colorimetric values of the patch images and interpolating grid points of a color conversion LUT (lookup table). In addition, the functions of the variation calculation unit 511, the correction/interpolation method determination unit 512, and the profile calculation unit 513 are exerted through the executions of programs corresponding to the respective functions by the CPU 110.

Figure 4:
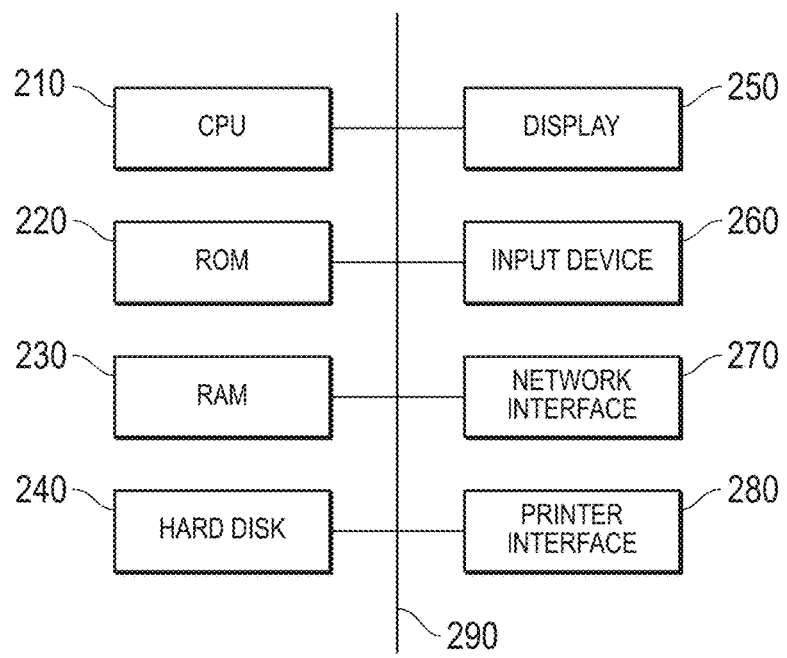
FIG. 4 is a block diagram showing a schematic structure of a controller.

FIG. 4 is a block diagram showing a schematic structure of the controllers 200a and 200b. Since the controllers 200a and 200b are controllers of the same model, the controller 200a will be described as a representative one hereinbelow.

The controller 200a includes a CPU 210, a ROM 220, a RAM 230, a hard disk 240, a display 250, an input device 260, a network interface 270, and a printer interface 280, which are connected to each other via a bus 290 for receiving and transmitting signals. Among the above-described respective units of the controller 200a, a description of the units having the same functions as those of the above-described respective units of the PC 100 will be omitted.

The printer interface 280 is an interface for communicating with the locally connected printer 300a.

The hard disk 240 stores a color conversion LUT of an ICC (International Color Consortium) printer profile or the like. Additionally, the hard disk 240 stores a RIP process program for converting CMYK values of each pixel by using the color conversion LUT while developing print data described in a page description language into bit map image data.

Figure 5:
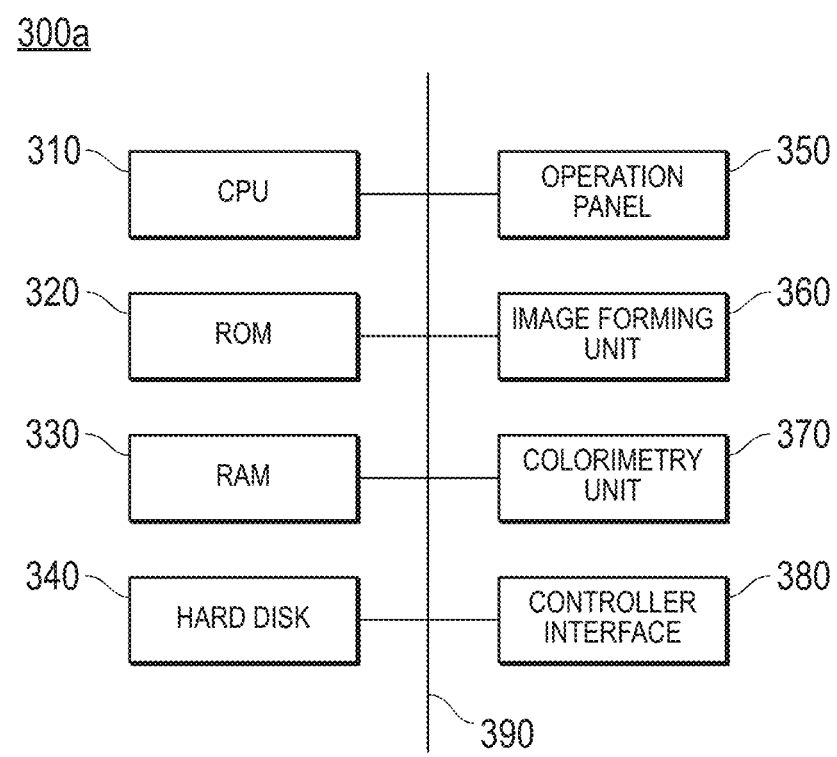
FIG. 5 is a block diagram showing a schematic structure of a printer.

FIG. 5 is a block diagram showing a schematic structure of the printers 300a and 300b. Since the printers 300a and 300b are printers of the same model, the printer 300a will be described as a representative one hereinbelow.

The printer 300a includes a CPU 310, a ROM 320, a RAM 330, a hard disk 340, an operation panel 350, an image forming unit 360, a colorimetry unit 370, and a controller interface 380, which are connected to each other via a bus 390 for receiving and transmitting signals. Among the above-described respective units of the printer 300a, a description of the units having the same functions as those of the above-described respective units of the PC 100 will be omitted.

The operation panel 350 is used to display various kinds of information and input various kinds of commands. The image forming unit 360 forms an image based on image data received from the controller 200a on a record sheet such as paper by using a known image forming process such as an electro-photographic process. The image forming unit 360 forms an image using toners of four basic colors: C, M, Y, and K.

The colorimetry unit 370 colorimetrically measures an image formed by the image forming unit 360. The colorimetry unit 370 is, for example, a spectrophotometer provided with three kinds of sensors corresponding to the three primary colors of light: red, green, and blue and a spectroscopic sensor for performing colorimetry on the basis of output values (RGB values) from the three kinds of sensors with respect to respective parts of a color image.

The controller interface 380 is an interface for communicating with the locally connected controller 200a.

The PC 100, the controllers 200a and 200b, and the printers 300a and 300b may include elements other than the above-described elements or may omit some of the above-described elements.

In the print system thus configured, a printer profile is created by causing a printer to output a color chart and correlating CMYK values of the patch images with colorimetric values thereof. Then, when a predetermined condition is satisfied, a printer profile is recreated. Hereinafter, a description will be given of operation of the print system according to the present embodiment with reference to FIGS. 6 to 16. The following description illustrates an exemplary case of creation of a printer profile reflecting color variation per printer output.

First, referring to a sequence chart of FIG. 6, a description will be given on an outline of operation of the print system.

Figure 6:
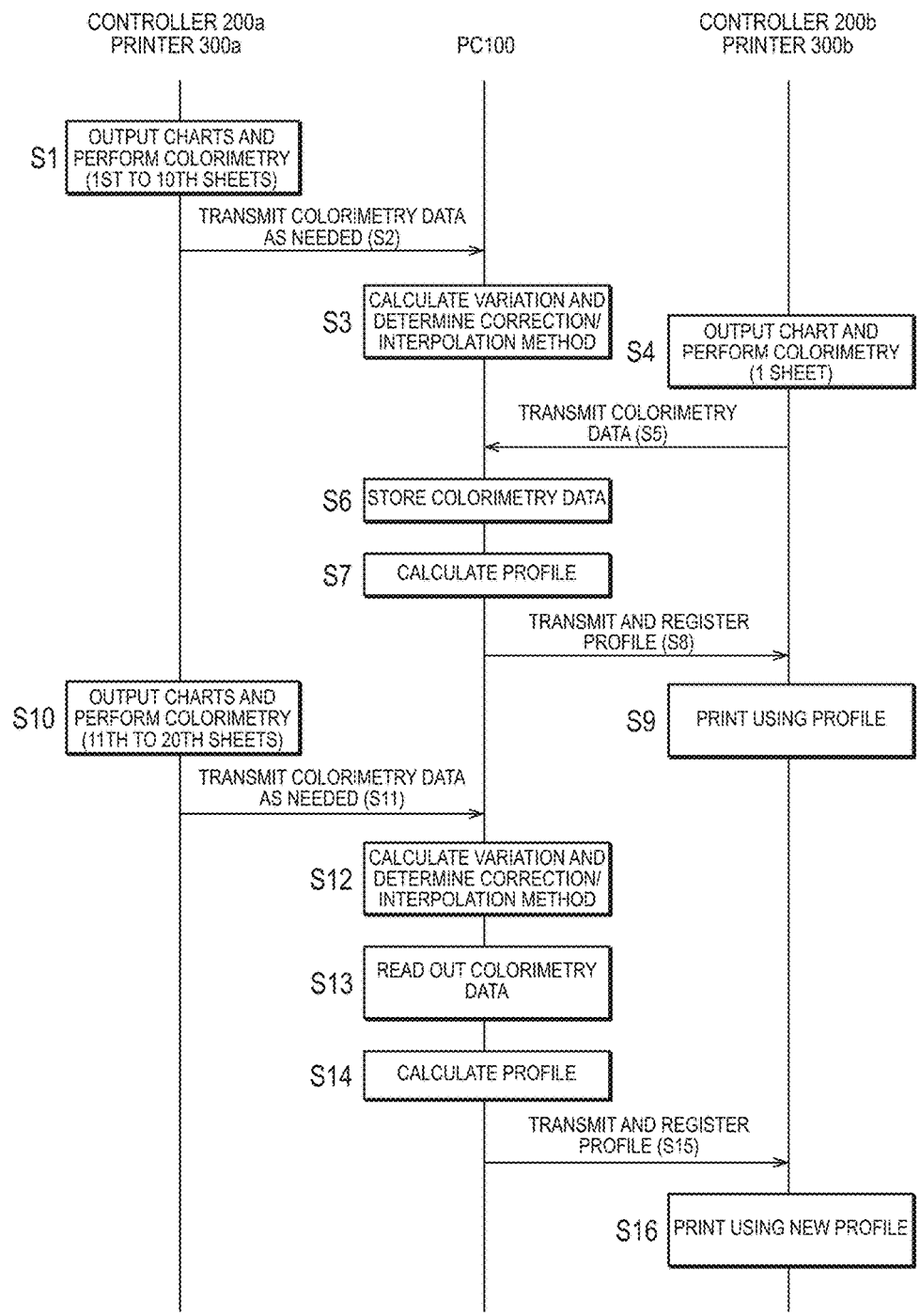
FIG. 6 is a sequence chart illustrating an outline of operation of the print system.

FIG. 6 shows a case where a printer profile for the printer 300b is created using data of colorimetric values of a color chart output by the printer 300a.

First, the printer 300a outputs 10 sheets of the color chart to perform colorimetry of each color chart (step S1). More specifically, the printer 300a sequentially outputs the 10 sheets (1st to 10th sheets) of the color chart to cause the colorimetry unit 370 to colorimetrically measure each patch image included in the color charts. Data of colorimetric values (hereinafter referred to also as "colorimetry data") obtained by the colorimetry of the patch images is transmitted to the PC 100 as needed (step S2).

The PC 100 receives the colorimetry data of the 10 sheets of the color chart and calculates a degree of variation in each color to determine a correction/interpolation calculation method (step S3). More specifically, the PC 100 first analyzes the colorimetry data of the 10 sheets of the color chart to calculate the degree of variation in a color of each patch image included in the color charts. Then, the PC 100 determines a correction/interpolation calculation method according to the degree of the color variation.

Next, the printer 300b outputs one sheet of the color chart to perform colorimetry of the color chart (step S4). More specifically, the printer 300b outputs one sheet of the color chart to cause the colorimetry unit 370 to colorimetrically measure each patch image included in the color chart. Colorimetry data obtained by the colorimetry of the patch images is transmitted to the PC 100 (step S5).

The PC 100 receives the colorimetry data of the color chart output by the printer 300b and stores the colorimetry data in the hard disk 140 (step S6).

Then, the PC 100 calculates a printer profile (step S7). More specifically, the PC 100 creates a printer profile for the printer 300b from the colorimetry data of the color chart output by the printer 300b by using the correction/interpolation calculation method determined by the process shown at the step S3.

The created printer profile is transmitted to the controller 200b and registered therein (step S8).

Then, the controller 200b and the printer 300b perform printing by using the registered printer profile (step S9). More specifically, the controller 200b performs a color conversion process of image data by using the registered printer profile, and the printer 300b forms, on paper, an image based on the image data subjected to the color conversion process.

After that, the printer 300a outputs additional 10 sheets (11th to 20th sheets) of the color chart to perform colorimetry of each color chart (step S10). Colorimetry data obtained by the colorimetry of the patch images is transmitted to the PC 100 as needed (step S11).

The PC 100 additionally receives the colorimetry data of the 10 sheets of the color chart and analyzes the colorimetry data of the 20 sheets of the color chart to calculate the degree of variation in each color, thereby determining a correction/interpolation calculation method (step S12).

Next, the PC 100 reads out the colorimetry data (step S13). More specifically, the PC 100 reads out the colorimetry data of the color chart output by the printer 300b, which was stored in the hard disk 140 by the process shown at the step S6.

Then, the PC 100 calculates a printer profile (step S14). More specifically, the PC 100 creates a printer profile for the printer 300b from the colorimetry data read out by the process shown at the step S13 by using the correction/interpolation calculation method determined by the process shown at the step S12.

The created printer profile is transmitted to the controller 200b and registered therein (step S15). Then, the controller 200b and the printer 300b perform printing by using the newly registered printer profile (step S16).

As described above, in the print system of the present embodiment, first, the printer 300a is caused to output the 10 sheets of a color chart. Next, the degree of color variation is calculated from the data of the colorimetric values of the 10 sheets of the color chart to determine a correction/interpolation calculation method according to the degree of the color variation. Next, the printer 300b is caused to output one sheet of the color chart to acquire colorimetric values. Then, using the correction/interpolation calculation method according to the degree of the color variation, a printer profile for the printer 300b is created from the acquired colorimetric values. After that, at the time when additional 10 sheets of the color chart has been output by the printer 300a, the degree of the color variation is calculated again from the data of the colorimetric values of the 20 sheets of the color chart to determine again a correction/interpolation calculation method according to the degree of the color variation. Then, using the correction/interpolation calculation method determined again, a printer profile for the printer 300b is recreated from the colorimetric values.

Hereinafter, a detailed description will be given of operation of the print system with reference to FIGS. 7 to 16. First, a color chart output by the printers 300a and 300b will be described with reference to FIGS. 7 and 8.

Figure 7:
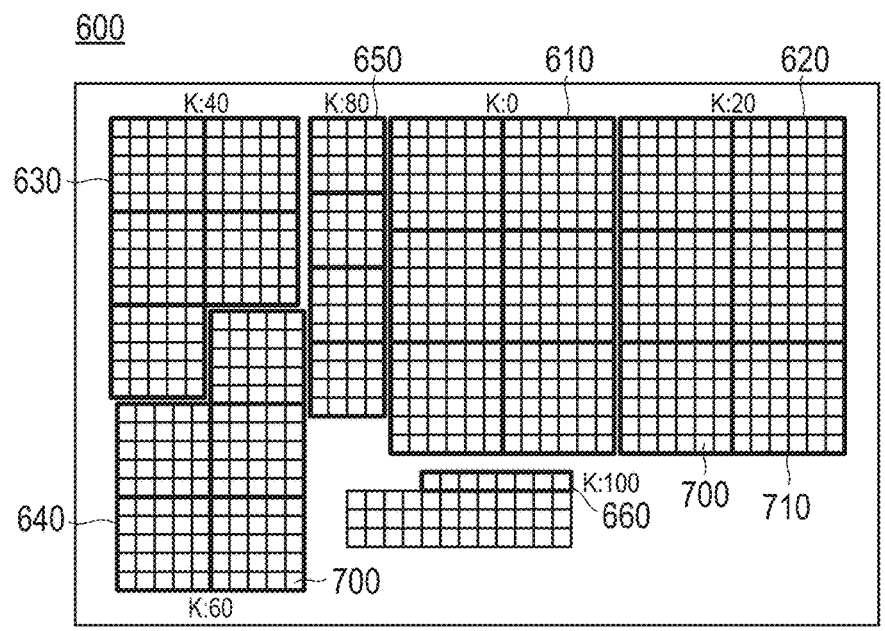
FIG. 7 is a diagram showing an example of a color chart.
Figure 8:
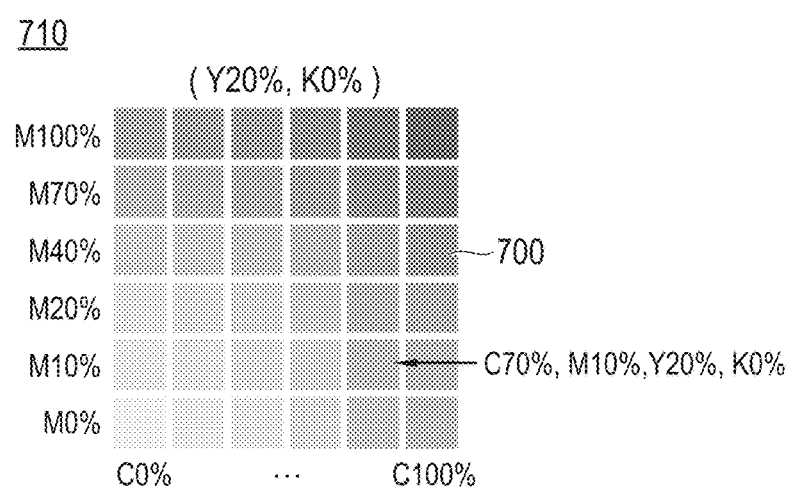
FIG. 8 is a partially enlarged diagram of FIG. 7.

FIG. 7 is a diagram showing an example of a color chart 600, and FIG. 8 is a partially enlarged diagram of FIG. 7. As shown in FIG. 7, the color chart 600 includes patch images 700 having colors corresponding to combinations of CMYK values. In FIG. 7, the patch images 700 included in one sheet of the color chart 600 are classified into six patch image groups 610 to 660 by K values (K: 0, 20, 40, 60, 80, and 100%).

Then, the patch image groups 610 and 620 of K: 0% and 20% each include 216 (6×6×6) patch images 700 corresponding to combinations of C, M, and Y each: 0, 10, 20, 40, 70, and 100%. The 216 patch images 700 are classified into six patch image blocks 710 by Y values. Then, as shown in FIG. 8, each patch image block 710 has a structure in which 36 (6×6) patch images 700 are two-dimensionally arranged in such a manner that M value and C value gradually change.

Similarly, the patch image groups 630 and 640 of K: 40% and 60% each include 125 (5×5×5) patch images 700 corresponding to combinations of C, M, and Y each: 0, 20, 40, 70, and 100%. The 125 patch images 700 are classified into five patch image blocks 710 by Y values. In addition, the patch image group 650 of K: 80% includes 64 (4×4×4) patch images 700 corresponding to combinations of C, M, and Y each: 0, 40, 70, and 100%, and the 64 patch images 700 are classified into four patch image blocks 710 by Y values. Additionally, the patch image group 660 of K: 100% includes 8 (2×2×2) patch images 700 corresponding to combinations of C, M, and Y each: 0 and 100%.

The color charts 600 as described above are output by the printers 300a and 300b, and colorimetric values of the patch images included in the color charts are correlated with the CMYK values of the patch images, thereby creating a printer profile. Hereinafter, an operation of the PC 100 for creating a printer profile will be described with reference to FIGS. 9 to 16.

Figure 9:
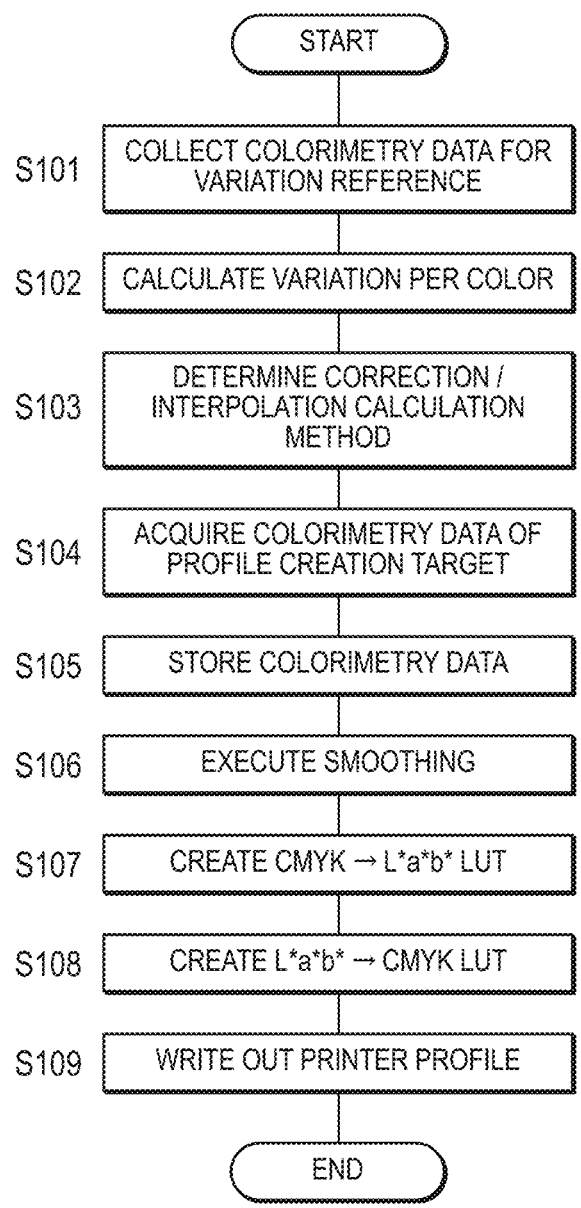
FIG. 9 is a flowchart showing steps of a first profile creation process executed by the PC.

FIG. 9 is a flowchart showing steps of a first profile creation process executed by the PC 100. Additionally, an algorithm represented by the flowchart of FIG. 9 is stored as a program in the hard disk 140 of the PC 100 and executed by the CPU 110.

First, the PC 100 collects colorimetry data for variation reference (step S101). Specifically, for example, the PC 100 transmits a print job to the controller 200a to cause the printer 300a to output 10 sheets of the same color chart 600. Then, the PC 100 acquires colorimetric values (for example, L*a*b* values) obtained by colorimetrically measuring patch images in the 10 sheets of the color chart 600 by the colorimetry unit 370 of the printer 300a and stores the colorimetric values in the DB 520 of the hard disk 140.

In addition, the 10 sheets of the color chart 600 are preferably output by the printer 300a, while changing environmental temperature and humidity or changing an output condition, i.e., a first page output immediately after pausing or one output during continuous operation. Then, all of the patch images 700 in the 10 sheets of the color chart 600 output from the printer 300a are colorimetrically measured. The PC 100 acquires 10 sets of the colorimetric values per patch image and stores them in the hard disk 140.

Next, the PC 100 calculates the degree of variation in each color (step S102). Specifically, the PC 100 calculates the degree of variation in a color of each patch image (CMYK values) in the color chart 600 on the basis of the data of the colorimetric values of the 10 sheets of the color chart 600 collected by the process shown at the step S101. The present embodiment calculates, for each patch image, the degree of variation in each color by calculating standard deviations of the 10 sets of the colorimetric values collected per patch image. Details of the process for calculating the degree of the color variation will be described later.

Next, the PC 100 determines a correction/interpolation calculation method (step S103). Specifically, according to the degree of the variation calculated by the process shown at the step S102, the PC 100 determines a calculation formula for correcting the colorimetric values of the patch images and a calculation formula for interpolating grid points of a color conversion LUT indicating the correspondence relationship between CMYK values of the patch images and the colorimetric values thereof. In the present embodiment, the PC 100 determines the correction/interpolation calculation method in such a manner that smoothness is prioritized in colors with a large degree of variation and reproduction accuracy is prioritized in colors with a small degree of variation. Details of the process for determining the correction/interpolation calculation method will be described later.

Next, the PC 100 acquires colorimetry data of a profile creation target and stores the data in the hard disk 140 (steps S104 and S105). Specifically, the PC 100 first transmits a print job to the controller 200b to cause the printer 300b to output one sheet of the color chart 600. Then, the PC 100 acquires colorimetric values (L*a*b* values) obtained by colorimetrically measuring the patch images 700 in the color chart 600 by the colorimetry unit 370 of the printer 300b and stores them in the DB 520 of the hard disk 140.

Next, the PC 100 executes a smoothing process of the colorimetric values (step S106). Specifically, the PC 100 performs a correction process using the calculation formula determined by the process shown at the step S103 to correct the colorimetric values acquired by the process shown at the step S104. Details of the process for correcting the colorimetric values will be described later.

Next, the PC 100 creates a CMYK→L*a*b* color conversion LUT (step S107). Specifically, regarding a color conversion LUT indicating the correspondence relationship between the CMYK values of the patch images and the colorimetric values thereof corrected by the process shown at the step S106, the PC 100 performs an interpolation process by using the calculation formula determined by the process shown at the step S103 to create a CMYK→L*a*b* color conversion LUT (an A2B table) having a predetermined number of grid points. Details of the process for interpolating the grid points of the color conversion LUT will be described later.

Next, the PC 100 creates an L*a*b*→CMYK color conversion LUT (step S108). Specifically, the PC 100 creates an L*a*b*→CMYK color conversion LUT (a B2A table) from the CMYK→L*a*b* color conversion LUT created by the process shown at the step S107. The technique itself for creating the L*a*b*→CMYK color conversion LUT from the CMYK→L*a*b* color conversion LUT is a typical color conversion LUT creation technique, and thus a detailed description thereof will be omitted.

Then, the PC 100 writes out a printer profile in a predetermined format (step S109) and ends the process. Specifically, the PC 100 writes out the CMYK→L*a*b* color conversion LUT created by the process shown at the step S107 and the L*a*b**CMYK color conversion LUT created by the process shown at the step S108 in a format conforming to the ICC specification into the DB 520 of the hard disk 140 and ends the process. The printer profile written out into the DB 520 is transmitted to the controller 200b and used in a color conversion process of image data.

As described above, in the process of the flowchart shown in FIG. 9, first, the printer 300a is caused to output the 10 sheets of the color chart 600 to accumulate the data of the colorimetric values. Then, with the data of the colorimetric values accumulated, the degree of color variation in each patch image is specified to determine a correction/interpolation calculation method according to the degree of the color variation. After that, the printer 300b is caused to output only one sheet of the color chart 600 to acquire colorimetric values of the patch images 700. Then, using the determined correction/interpolation calculation method, a printer profile for the printer 300b is created from the colorimetric values of the patch images 700. With this configuration, the printer profile is created using the calculation formulas according to the degree of the color variation. Thus, a printer profile reflecting an average value of the color variation can be created by causing the printer 300b to output one sheet of the color chart.

Then, in the present embodiment, when the data of the colorimetric values accumulated regarding each patch image increases by a predetermined amount, a printer profile is recreated. Hereinafter, a description will be given of an operation of the PC 100 for recreating a printer profile, with reference to FIGS. 10 and 11.

Figure 10:
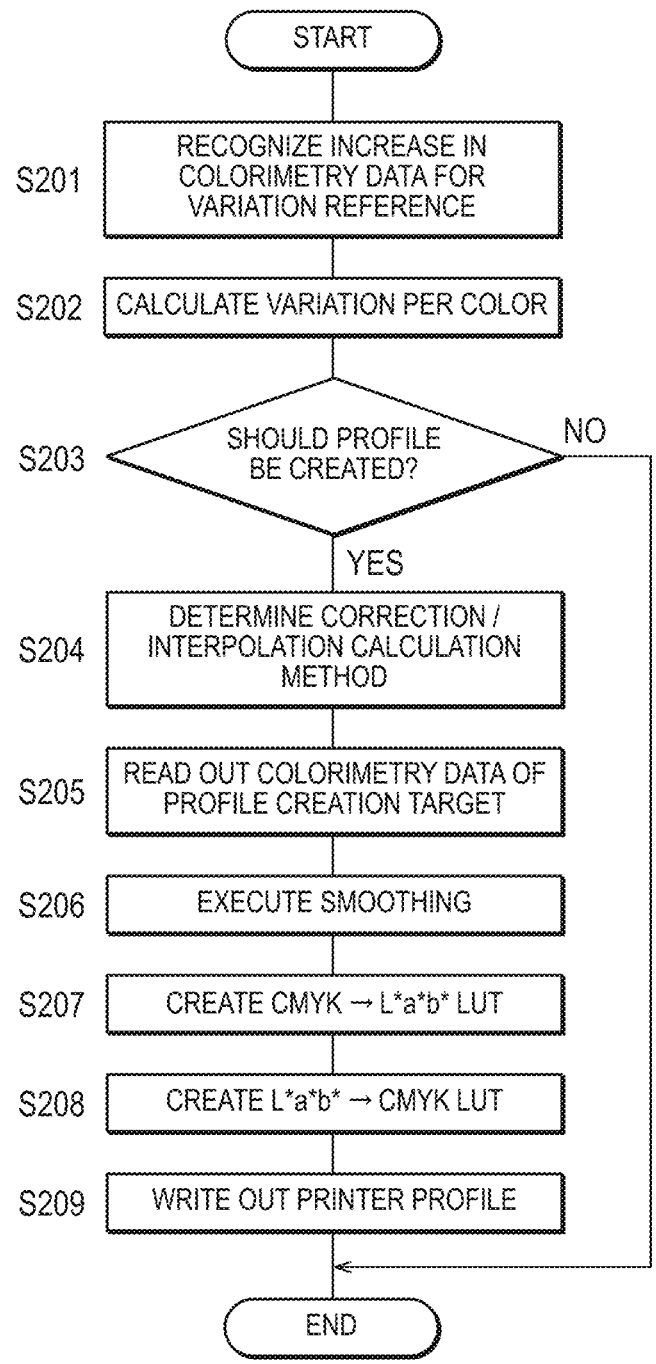
FIG. 10 is a flowchart showing steps of a second profile creation process executed by the PC.

FIG. 10 is a flowchart showing steps of a second profile creation process executed by the PC 100. Additionally, an algorithm represented by the flowchart of FIG. 10 is stored as a program in the hard disk 140 of the PC 100 and executed by the CPU 110.

First, the PC 100 recognizes that the colorimetry data for variation reference has increased by a predetermined amount (step S201). Specifically, the PC 100 recognizes that additional 10 sheets of the color chart has been output from the printer 300a and thereby the data of the colorimetric values has increased by the amount of the 10 sheets of the color chart.

Next, the PC 100 calculates the degree of variation in each color (step S202). Specifically, based on the data of the colorimetric values of the 20 sheets of the color chart, the PC 100 calculates the degree of variation in the color of each patch image in the color chart 600.

Next, the PC 100 determines whether or not to create a printer profile (step S203). Specifically, the PC 100 compares degrees of the color variation before and after the increase in the data of the colorimetric values to determine whether or not to create a printer profile. More specifically, the PC 100 compares, per color, the degree of the variation calculated by the process shown at the step S202 with the degree of the variation calculated by the process shown at the step S102 of FIG. 9. Then, when there are a predetermined number of colors showing changes in the degree of the variation, the PC 100 determines to create a printer profile.

When the PC 100 determines not to create a printer profile (step S203: NO), the PC 100 ends the process.

On the other hand, when the PC 100 determines to create a printer profile (step S203: YES), the PC 100 determines a correction/interpolation calculation method (step S204). Specifically, the PC 100 determines a calculation formula for correcting the colorimetric values of the patch images and a calculation formula for interpolating the grid points of the color conversion LUT according to the degree of the color variation calculated by the process shown at the step S202.

Next, the PC 100 reads out colorimetry data of a profile creation target (step S205). Specifically, the PC 100 reads out the colorimetric values of the color chart output by the printer 300b, which was stored in the hard disk 140 by the process shown at the step S105 of FIG. 9.

Next, the PC 100 executes a smoothing process (step S206). Specifically, the PC 100 performs a correction process using the calculation formula determined by the process shown at the step S204 to correct the colorimetric values read out by the process shown at the step S205.

Next, the PC 100 creates a CMYK→L*a*b* color conversion LUT (step S207). Specifically, regarding a color conversion LUT indicating the correspondence relationship between the CMYK values of the patch images and the colorimetric values thereof corrected by the process shown at the step S206, the PC 100 performs an interpolation process by using the calculation formula determined by the process shown at the step S204 to create a CMYK*L*a*b* color conversion LUT (an A2B table) having a predetermined number of grid points.

Since the processes shown at the steps S208 and S209 are the same as those shown at the steps S108 and S109 of FIG. 9, a detailed description thereof will be omitted.

As described above, in the process of the flowchart shown in FIG. 10, when the data of the accumulated colorimetric values increases by a predetermined amount, the data after the increase allows the specification of the degree of color variation in each patch image, thereby determining a correction/interpolation calculation method according to the degree of the color variation. Then, using the determined correction/interpolation calculation method, a printer profile for the printer 300b is newly created from the colorimetric values of the patch images 700. With this configuration, a printer profile is recreated on the basis of the data of more colorimetric values. Thus, there can be created a printer profile that more accurately reflects an average value of the color variation.

The newly created printer profile is transmitted to the controller 200b. Then, the old printer profile registered in the controller 200b is replaced by the newly created printer profile. In addition, the old printer profile is preferably backed up for storage by changing names.

Figure 11:
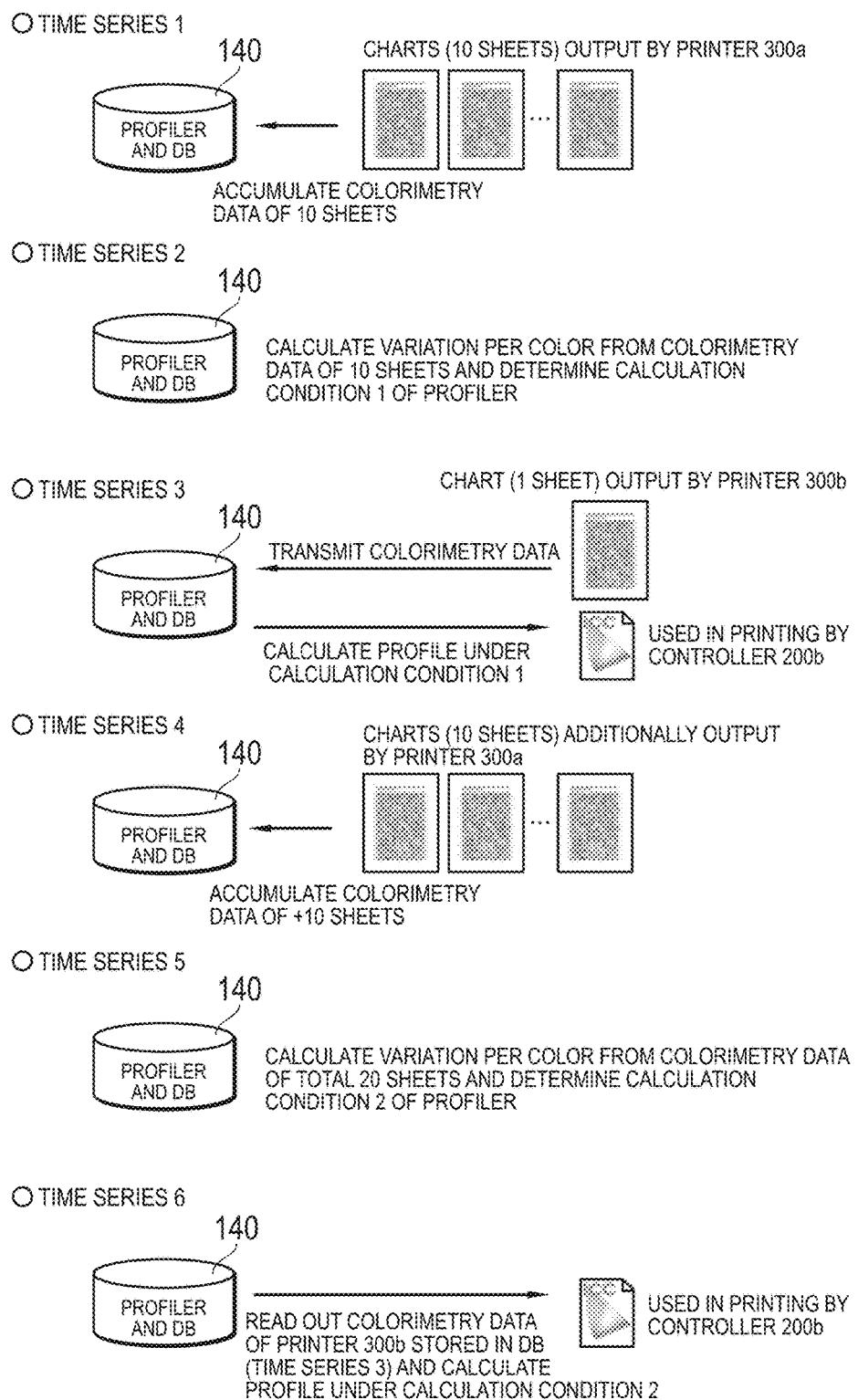
FIG. 11 is a diagram for illustrating a profile creation process.

FIG. 11 is a diagram for illustrating a profile creation process of the present embodiment. In FIG. 11, time series are shown by indicating as time series 1, time series 2, . . . and time series 6.

In time series 1, the hard disk 140 of the PC 100 stores data of colorimetric values of 10 sheets of a color chart output by the printer 300a.

In time series 2, the PC 100 executes the profiler 510 to calculate the degree of variation in each color from the data of the colorimetric values of the 10 sheets of the color chart, thereby determining a first calculation condition including a correction/interpolation calculation method.

In time series 3, the PC 100 receives transmitted data of colorimetric values of one sheet of the color chart output by the printer 300b. Then, the PC 100 executes the profiler 510 to apply the first calculation condition to the data of the colorimetric values, thereby creating a printer profile for the printer 300b. The created printer profile is registered in the controller 200b and used in a printing process by the printer 300b.

In time series 4, the hard disk 140 of the PC 100 stores the data of the colorimetric values of the 10 sheets of the color chart additionally output by the printer 300a. As a result, the data of the colorimetric values of 20 sheets of the color chart is accumulated in the hard disk 140.

In time series 5, the PC 100 executes the profiler 510 to calculate the degree of variation in each color from the data of the colorimetric values of the 20 sheets of the color chart, thereby determining a second calculation condition including a correction/interpolation calculation method.

In time series 6, the PC 100 executes the profiler 510 to apply the second calculation condition to the data of the colorimetric values stored in the hard disk 140, thereby newly creating a printer profile for the printer 300b. The newly created printer profile is registered in the controller 200b and used in a printing process by the printer 300b.

As described above, in the profile creation process of the present embodiment, when the data of accumulated colorimetric values increases by a predetermined amount, a printer profile is recreated on the basis of the data of colorimetric values after the increase. As the amount of data of colorimetric values used for the calculation of a printer profile is larger, an average value of color variation is more accurately reflected in the printer profile. Accordingly, the profile creation process of the present embodiment can create a printer profile more accurately reflecting an average value of color variation.

In addition, in the above-described embodiment, after the first profile creation process for creating a printer profile, the second profile creation process for recreating a printer profile has been executed only once. However, the second profile creation process for recreating a printer profile can be repeatedly executed every time the data of colorimetric values increase by the amount of 10 sheets of the color chart.

Hereinafter, by referring to FIGS. 12 to 16, a detailed description will be given of the process for calculating the degree of color variation, the process for determining a correction/interpolation calculation method, the process for correcting colorimetric values of patch images, and the process for interpolating the grid points of the color conversion LUT that have been described above.

<Calculation of Degree of Color Variation>

Figure 12:
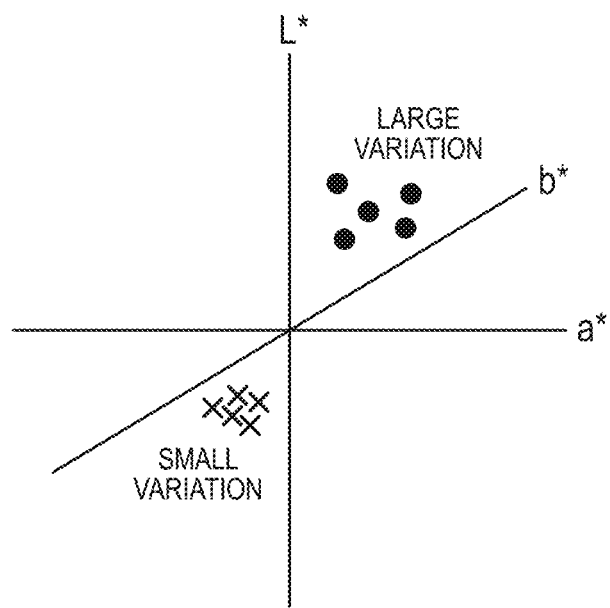
FIG. 12 is a diagram for illustrating the degrees of color variation.

First, the degree of color variation will be described with reference to FIG. 12. FIG. 12 is a diagram for illustrating the degrees of color variation in an L*a*b* color space. In FIG. 12, five points indicated by circles represent colorimetric values of each patch image obtained as a result of a five-time print-outputting of a patch image having a color corresponding to first CMYK values. Additionally, five points indicated by crosses represent colorimetric values of each patch image obtained as a result of a five-time print-outputting of a patch image having a color corresponding to second CMYK values.

As shown in FIG. 12, the colorimetric values of the patch images having the color corresponding to the first CMYK values are distributed in a wider range than the colorimetric values of the patch images having the color corresponding to the second CMYK values. In other words, the color corresponding to the first CMYK values exhibits a larger degree of variation per output than the color corresponding to the second CMYK values.

As described hereinabove, in the present embodiment, the degree of color variation in each patch image is specified from the data of the colorimetric values accumulated regarding the each patch image. Specifically, the PC 100 first calculates each of the standard deviations of the colorimetric values: values, a* values, and b* values regarding the color of each patch image from the data of the colorimetric values accumulated regarding the each patch image. Next, the PC 100 weights the standard deviation of the L* values by 0.5 times against the standard deviations of the a* values and the b* values to obtain a sum of the three standard deviations. Then, the PC 100 refers to a predetermined threshold value, and, based on the sum of the standard deviations, classifies the degree of color variation in each of the patch images 700 into three levels of "a", "b", and "c".

In the present embodiment, when the sum of the standard deviations is less than 1.0, the PC 100 classifies the degree of the variation as "a". In addition, when the sum of the standard deviations is not less than 1.0 and less than 3.0, the PC 100 classifies the degree of the variation as "b". When the sum of the standard deviations is not less than 3.0, the PC 100 classifies the degree of the variation as "c".

For example, when all of the standard deviations of the L* values, the a* values, and the b* values in the 10 sets of colorimetric values accumulated regarding one patch image 700 in the color charts 600 are 1, the sum of the standard deviations is 2.5 and the degree of the color variation is classified as "b". Additionally, in the calculation of the sum of the standard deviations of the L* values, the a* values, and the b* values, weighting the L* values by a small factor allows accuracy and robustness of the a* values and the b* values to be more improved than the L* values, thereby allowing the creation of a printer profile more excellent in visual color reproducibility.

<Determination of Correction/Interpolation Calculation Method>

As described hereinabove, the present embodiment determines a correction/interpolation calculation method according to the degree of color variation in each patch image.

(1) Determination of Correction Calculation Method

In the present embodiment, the PC 100 refers to a conversion table (see Table 1) indicating a relationship between degree of color variation, weighting factor of colorimetric values, and number of neighboring points for approximate value calculation, to determine, per patch image, a weighting factor of colorimetric values and a number of neighboring points for approximate value calculation to be applied to the correction process of colorimetric values, from the degree of variation in each color.

TABLE 1

| Degree of variation | Weight of colorimetric values | Number of neighboring points for approximate value calculation |
|---|---|---|
| a | 0.95 | 2 |
| b | 0.6 | 4 |
| c | 0.3 | 6 |

Table 1 shows an example of the conversion table indicating the relationship between degree of color variation, weighting factor of colorimetric values, and number of neighboring points for approximate value calculation. The PC 100 refers to the Table 1 to determine, per patch image, a weighting factor of colorimetric values and a number of neighboring points for approximate value calculation from the degree of the color variation so that as the degree of the color variation is larger, the weighting factor of the colorimetric values becomes smaller and the number of neighboring points for approximate value calculation increases.

(2) Determination of Interpolation Calculation Method

In the present embodiment, the PC 100 first selects a pair of grid points adjacent to each other from among a plurality of grid points of the color conversion LUT. Next, regarding two patch images corresponding to the selected pair of grid points, the PC 100 classifies the degree of the color variation in the two patch images (hereinafter referred to also as "degree of both-side variation") into three levels: "A", "B", and "C", from the degree of the color variation per patch image. Then, the PC 100 refers to a conversion table (see Table 2) indicating a relationship between degree of both-side variation, number of neighboring points for interpolation calculation, and weighting factor of linear approximate values to determine, per pair of grid points, a number of neighboring points and a weighting factor of linear approximate values to be applied to the interpolation process of grid points from the degree of the color variation.

TABLE 2

| Degree of both-side variation | Number of neighboring points for interpolation calculation | Weight of linear approximate values |
|---|---|---|
| A | 2 | 0.2 |
| B | 4 | 0.5 |
| C | 6 | 0.8 |

Table 2 shows an example of the conversion table indicating the relationship between degree of both-side variation, number, of neighboring points for interpolation calculation, and weighting factor of linear approximate values. When the degree of the variation calculated regarding each of the two patch images corresponding to the pair of grid points is both "a" or when the degree of the variation in one of the two patch images is "a" and the degree of the variation in the other one thereof is "b", the PC 100 classifies the degree of the both-side variation as "A". Additionally, when the degree of the variation in each of the two patch images is both "b" or when the degree of the variation in one thereof is "a" and the degree of the variation in the other one thereof is "c", the PC 100 classifies the degree of the both-side variation as "B". When the degree of the variation in each of the two patch images is both "c" or when the degree of the variation in one thereof is "b" and the degree of the variation in the other one thereof is "c", the PC 100 classifies the degree of the both-side variation as "C". Then, the PC 100 refers to the Table 2 to determine, per pair of grid points, a number of neighboring points for interpolation calculation and a weighting factor from the degree of the both-side variation so that as the degree of the color variation in the each patch image is larger, the number of neighboring points for interpolation calculation increases and the weighting factor of linear approximate values becomes larger.

<Correction of Colorimetric Values of Patch Image>

As described hereinabove, in the present embodiment, the colorimetric values of patch images are corrected using a correction calculation method determined according to the degree of the color variation. Specifically, the PC 100 corrects the colorimetric values of the patch images included in the color chart output by the printer 300b by applying the weighting factor of colorimetric values and the number of neighboring points for approximate value calculation determined according to the degree of the color variation.

In the present embodiment, the PC 100 first calculates approximate values (predicted approximate values) of colorimetric values of a correction target. Specifically, the PC 100 performs an interpolation or extrapolation calculation regarding the colorimetric values of the correction target by using colorimetric values of the same number of other patch images as the number of neighboring points for approximate value calculation determined according to the degree of the color variation to calculate approximate values of the colorimetric values of the correction target. More specifically, regarding an array of patch images where a value of one basic color has gradually changed from CMYK values of a patch image corresponding to the colorimetric values of the correction target, the PC 100 uses colorimetric values of the same number of patch images arranged before and after the patch image corresponding to the colorimetric values of the correction target or uses the colorimetric values of patch images arranged either therebefore or thereafter to calculate approximate values of the colorimetric values of the correction target. Here, when there is a shortage of colorimetric values usable with respect to the number of the neighboring points for approximate value calculation determined according to the degree of the color variation, the PC 100 calculates approximate values using only usable colorimetric values. For example, when the number of neighboring points for approximate value calculation is six but the number of sets of neighboring colorimetric values is only five, the PC 100 calculates approximate values using the five sets of colorimetric values. In addition, the technique itself for calculating approximate values of the colorimetric values of one patch image by interpolation calculation using the colorimetric values of other patch images is a typical interpolation calculation technique, and thus, a detailed description thereof will be omitted.

After calculating the approximate values of the colorimetric values of the correction target, the PC 100 calculates weighted average values between the colorimetric values of the correction target and the approximate values thereof by applying a weighting factor determined according to the degree of the color variation to correct the colorimetric values. For example, when the determined weighting factor is 0.6, the PC 100 calculates, as colorimetric values after the correction, sums of values obtained by multiplying the colorimetric values of the correction target by 0.6 and values obtained by multiplying the approximate values by 0.4.

In the present embodiment, the PC 100 corrects colorimetric values of all the patch images 700 included in the color chart 600. In this case, the PC 100 corrects the colorimetric values in a sequential order of colors corresponding to vertices, colors corresponding to ridgelines, colors corresponding to a surface other than the ridgelines, and colors corresponding to an inside of a CMYK color space whose axis variables are represented by C, M, Y, and K. Specifically, for example, first, regarding patch images having the colors corresponding to the vertices (where CMYK are all 0 or 100%) of the CMYK color space, the PC 100 corrects the colorimetric values of each patch image. Next, regarding K: 0 and 100%, the PC 100 corrects the colorimetric values of patch images having the colors corresponding to the ridgelines of the CMY color space, and then, regarding K: 20, 40, 60, and 80%, the PC 100 corrects the colorimetric values of patch images having the colors corresponding to the ridgelines of the CMY color space. Then, similarly, regarding K: 0 and 100%, the PC 100 corrects the colorimetric values of patch images having the colors corresponding to the surface of the CMY color space, and then, regarding K: 20%, 40%, 60%, and 80%, the PC 100 corrects the colorimetric values of patch images having the colors corresponding to the surface of the CMY color space. Furthermore, similarly, regarding K: 0% and 100%, the PC 100 corrects the colorimetric values of patch images having the colors corresponding to the inside of the CMY color space, and then, regarding K: 20%, 40%, 60%, and 80%, the PC 100 corrects the colorimetric values of patch images having the colors corresponding to the inside of the CMY color space. With this configuration, the colorimetric values are sequentially corrected starting from colors that seem to be highly stable in terms of an image forming process. Accordingly, the colorimetric values of the other colors are corrected on the basis of the colorimetric values of the colors that seem to be more accurate. Thus, inappropriate results are rarely obtained.

Furthermore, within the respective categories of the vertices, ridgelines, surface, and inside of the CMYK color space, it is preferable to preferentially correct the colorimetric values of an array of colors where the value of a basic color whose monochromatic solid image has lower brightness (solid brightness) changes. Specifically, for example, the colorimetric values are preferably corrected in a priority order of K, C, M, and Y. With this configuration, since the colorimetric values are sequentially corrected starting from a color that greatly contributes to change in color value, continuity in arrays of color values can be easily maintained.

Taking an example of the patch image block 710 shown in FIG. 8, for example, correction is first performed on the colorimetric values of a patch image 700 with C: 0%, M: 100%, Y: 20%, and K: 0% on an upper left side. Then, since C has lower solid brightness than M, correction is preferentially performed on the colorimetric values of a patch image 700 on a right side thereof where the C value changes: C 10%, M 100%, Y 20%, and K 0%, rather than the colorimetric values of a patch image 700 on a lower side thereof where the M value changes: C 0%, M 70%, Y 20%, and K 0%.

<Interpolation of Grid Points of Color Conversion LUT>

As described hereinabove, in the present embodiment, grid points of the color conversion LUT are interpolated using an interpolation calculation method determined according to the degree of color variation. Specifically, for each pair of grid points of the color conversion LUT, the PC 100 obtains grid points for interpolation between the each pair of grid points by applying the number of neighboring points for interpolation calculation and a weighting factor determined according to the degree of color variation.

In the present embodiment, the PC 100 first extracts a pair of grid points adjacent to each other from among a plurality of grid points of the color conversion LUT. Next, regarding a grid point for use in interpolation between the extracted pair of grid points, the PC 100 uses the same number of grid points as the number of neighboring points for interpolation calculation determined according to the degree of the color variation to perform a linear interpolation calculation and a polynomial interpolation calculation, respectively, so as to obtain a linear approximate value and a polynomial approximate value, respectively. Then, the PC 100 calculates a weighted average value between the linear approximate value and the polynomial approximate value by applying a weighting factor determined according to the degree of the color variation, so as to obtain color values (L*a*b* values) of the grid point for use in interpolation between the pair of grid points.

The PC 100 calculates the linear approximate value and the polynomial approximate value by using the same number of grid points before and after a grid point whose color value is to be obtained. Here, when there is a shortage of the number of grid points usable with respect to the number of neighboring points for interpolation calculation determined according to the degree of the color variation, the PC 100 calculates the approximate values by adding a grid point located either before or after the grid point whose color value is to be obtained. However, when no grid point is left both therebefore and thereafter, the PC 100 calculates the approximate values by using only usable grid points. For example, when the number of neighboring points for interpolation calculation is six and a total number of grid points left therebefore and thereafter is only five, the PC 100 calculates the approximate values by using the five grid points. The technique itself for calculating the approximate values of the color value of a specific grid point by an interpolation calculation using a plurality of neighboring grid points is a typical interpolation calculation technique, and thus, a detailed description thereof will be omitted. In addition, examples of the polynomial interpolation include Neville interpolation, spline interpolation, Lagrange interpolation, and Newton interpolation.

Furthermore, in the present embodiment, the PC 100 creates a color conversion LUT with 5% increments for each of CMYK by repeating the interpolation process two times. Specifically, as shown in FIG. 13, for example, the PC 100 first performs a first-time interpolation process regarding a grid point group where a specific color value gradually changes, like 0, 10, 20, 40, 70, and 100%, thereby obtaining grid points of 30, 55, and 85%. Then, the PC 100 performs a second-time interpolation process by using the newly obtained grid points to obtain remaining grid points of 5, 15, 25%, etc.

In this case, the PC 100 performs the interpolation process in a sequential order of pairs of grid points corresponding to ridgelines, pairs of grid points corresponding to a surface other than the ridgelines, and pairs of grid points corresponding to an inside of a CMYK color space whose axis variables are represented by CMYK. Specifically, for example, first, regarding each of K: 0, 20, 40, 60, 80, and 100%, the PC 100 performs the interpolation process on pairs of grid points corresponding to the ridgelines of the CMY color space. Then, similarly, regarding each of K: 0, 20, 40, 60, 80, and 100%, the PC 100 performs the interpolation process on pairs of grid points corresponding to the surface of the CMY color space. Furthermore, similarly, regarding each of K: 0, 20, 40, 60, 80, and 100%, the PC 100 performs the interpolation process on pairs of grid points corresponding to the inside of the CMY color space. After that, the PC 100 performs the interpolation process on pairs of grid points of K: 0, 20, 40, 60, 80, and 100%. With this configuration, since the grid points are sequentially interpolated starting from colors estimated to be highly stable in terms of an image forming process, other grid points are interpolated on the basis of grid points that seem to be more accurate. Thus, inappropriate results are rarely obtained.

Furthermore, within each of the categories of the ridgelines, the surface, and the inside of the CMYK color space, preferably, the interpolation process of grid points is preferentially performed on an array of grid points where a value of a basic color whose monochromatic solid image has lower brightness (solid brightness) changes. Specifically, preferably, the interpolation process of grid points is performed, for example, in a priority order of K, C, M, and Y. With this configuration, since grid points are sequentially interpolated starting from a color that greatly contributes to change in color value, continuity in arrays of color values can be easily maintained.

Taking an example of the patch image block 710 shown in FIG. 8, since C has lower solid brightness than M, interpolation is more preferentially performed between a grid point of C 100%, M 100%, Y 20%, and K 0% and a grid point of C 70%, M 100%, Y 20%, and K 0% than between a grid point of C 100%, M 100%, Y 20%, and K 0% and a grid point of C 100%, M 70%, Y 20%, and K 0%.

Hereinafter, the correction process and the interpolation process of the present embodiment will be further described with reference to FIGS. 14A and 14B to FIG. 16.

Figure 14A:
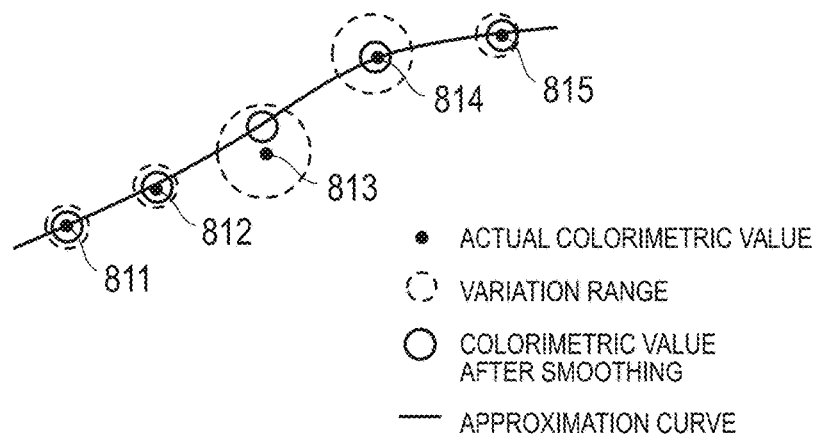
FIGS. 14A and 14B are diagrams each showing a relationship between degree of color variation and correction result of colorimetric values.
Figure 14B:
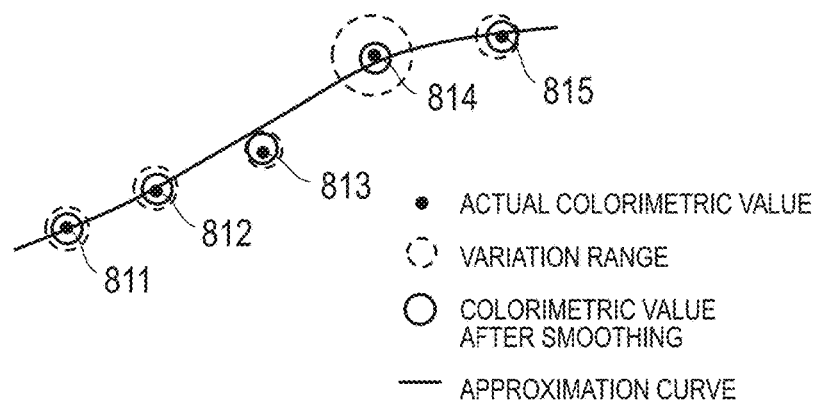

FIGS. 14A and 14B are diagrams each showing a relationship between degree of color variation and correction result of colorimetric values. Points 811 to 815 indicated by black circles in FIGS. 14A and 14B represent colorimetric values of patch images, and circles indicated by broken lines each represent a range of color variation of each patch image. Circles indicated by solid lines each represent a range of colorimetric values after correction. As described hereinabove, in the correction process of the present embodiment, first, the approximate value of the colorimetric value of a correction target is calculated by using the colorimetric values of a plurality of other patch images. Then, the weighted average value between the colorimetric value of the correction target and the approximate value thereof is calculated to correct the colorimetric value.

Regarding the colorimetric value 813 showing a large degree of color variation shown in FIG. 14A, the number of the other colorimetric values to be used for approximate value calculation is increased. Additionally, the weighting factor is changed so that a weight of the approximate value becomes large, thereby calculating the weighted average value between the approximate value and the colorimetric value. Accordingly, as for the colorimetric value 813 with the large degree of color variation, the colorimetric value after correction is close to the approximate value (approximation curve).

On the other hand, regarding the colorimetric value 813 showing a small degree of color variation shown in FIG. 14B, the number of the other colorimetric values to be used for approximate value calculation is reduced. Additionally, the weighting factor is changed so that the weight of the approximate value becomes small, thereby calculating the weighted average value between the approximate value and the colorimetric value. Accordingly, as for the colorimetric value 813 with the small degree of color variation, the colorimetric value after correction is close to original colorimetric value.

As described above, in the correction process of the present embodiment, the colorimetric values are corrected in such a manner that smoothness is prioritized in a color with a large degree of variation and reproduction accuracy is prioritized in a color with a small degree of variation. With this configuration, an average value of color variation can be reflected in a printer profile, while leaving color characteristics specific to the printer 300b.

Figure 15:
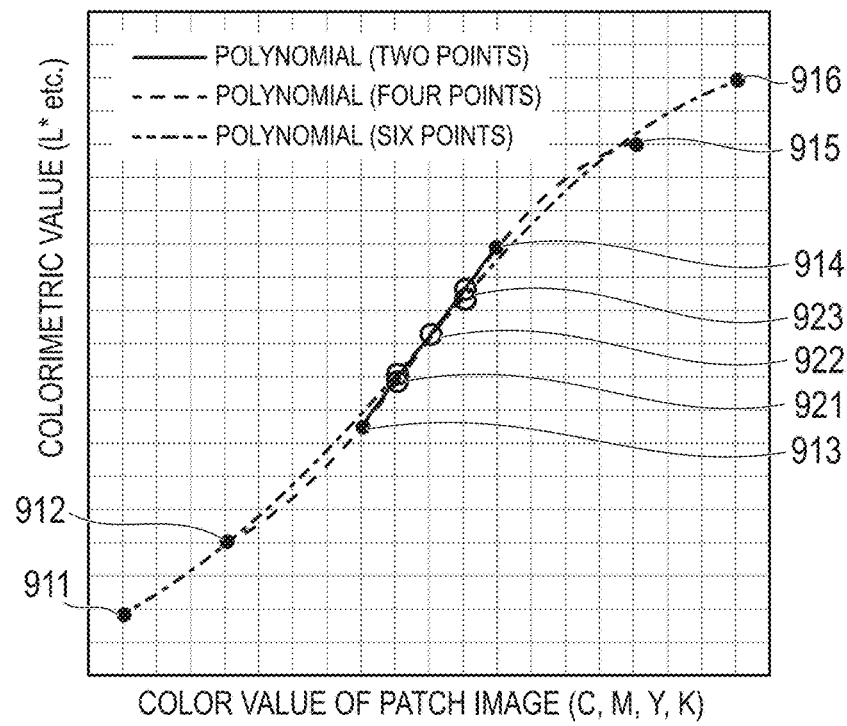
FIG. 15 is a diagram showing a relationship between degree of color variation and number of neighboring points for interpolation calculation.

FIG. 15 is a diagram showing a relationship between degree of color variation and number of neighboring points for interpolation calculation. The vertical axis of FIG. 15 represents colorimetric value and the horizontal axis thereof represents color value of one of the four basic colors: C, M, Y, and K, i.e, of a remaining one in a state where color values of three of C, M, Y, and K are fixed. In FIG. 15, points 911 to 916 indicated by black circles represent grid points where colorimetric values have been acquired. Regarding FIG. 15, a description will be given of an exemplary case of obtaining three grid points 921 to 923 for use in interpolation between grid points 913 and 914 adjacent to each other.

As described hereinabove, in the interpolation process of the present embodiment, the number of grid points is changed according to the degree of the color variation so that as the degree of color variation in two patch images corresponding to a pair of grid points is larger, the number of grid points for use in the interpolation calculation increases. Specifically, for example, when the degree of the color variation in two patch images corresponding to the pair of grid points 913 and 914 is classified as the above "A", a color value of a grid point 922 is calculated by an interpolation calculation using the two grid points 913 and 914. In addition, when the degree of the color variation in the two patch images is classified as the above "B", the color value of the grid point 922 is calculated by an interpolation calculation using four grid points 912 to 915. Additionally, when the degree of the color variation in the two patch images is classified as the above "C", the color value of the grid point 922 is calculated by an interpolation calculation using six grid points 911 to 916.

After that, color values of grid points 921 and 923 are calculated using the same number of grid points as the number of the grid points used for the interpolation calculation of the grid point 922. In the present embodiment, the color values of the grid points 921 and 923 are calculated using a plurality of grid points including the grid point 922. However, unlike the present embodiment, the color values of the grid points 921 and 923 may be calculated using the same grid points as those used for the interpolation calculation of the grid point 922.

Figure 16:
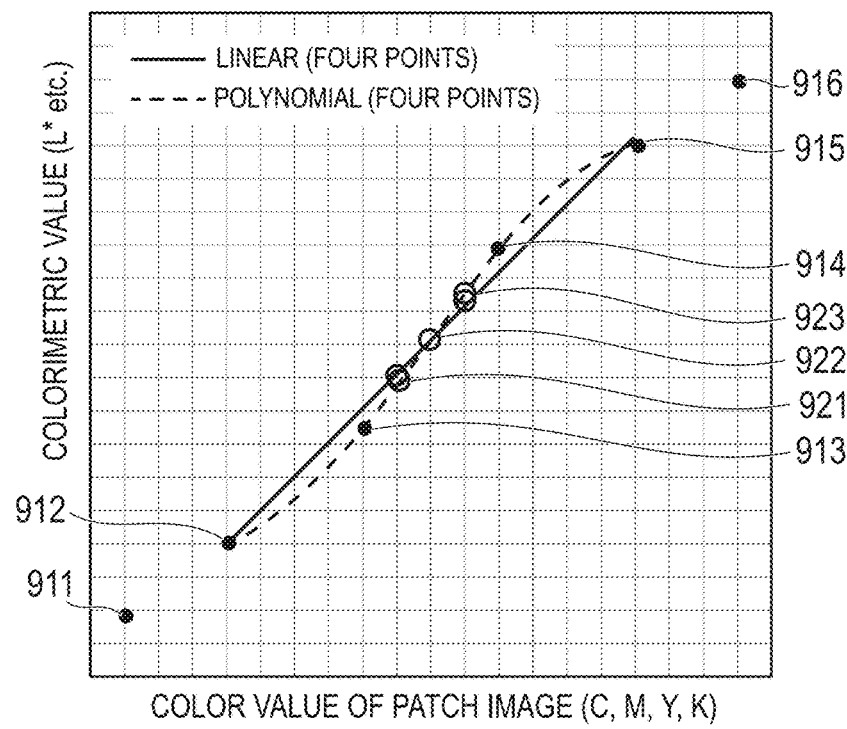
FIG. 16 a diagram showing a relationship between degree of color variation and weighting factor of linear approximate value.

FIG. 16 is a diagram showing a relationship between degree of color variation and weighting factor of linear approximate value. The vertical axis of FIG. 16 represents colorimetric values and the horizontal axis thereof represents color value of one of the four basic colors: C, M, Y, and K, i.e., of a remaining one in the state where color values of three of C, M, Y, and K are fixed. In FIG. 16, points 911 to 916 indicated by black circles are grid points where colorimetric values have been acquired.

As described hereinabove, in the interpolation process of the present embodiment, the colors values of the grid points 921 to 923 are calculated by calculating weighted average values between the linear approximate values calculated by linear interpolation calculation and the polynomial approximate values calculated by polynomial interpolation calculation. Here, the weighting factor is changed according to the degree of color variation so that as the degree of color variation in the two patch images corresponding to the pair of grid points is larger, the weight of the linear approximate values becomes larger.

For example, when the degree of the color variation in a pair of patch images corresponding to the pair of grid points 913 and 914 is classified as the above "B", a linear interpolation calculation using the four grid points 912 to 915 is performed to calculate a linear approximate value of the grid point 922, as shown in FIG. 16. Additionally, a polynomial interpolation calculation using the four grid points 912 to 915 is performed to calculate a polynomial approximate value of the grid point 922. Then, a sum of a value obtained by multiplying the linear approximate value by 0.5 and a value obtained by multiplying the polynomial approximate value by 0.5 is calculated as the color value of the grid point 922.

As described above, in the interpolation process of the present embodiment, the grid points of the color conversion LUT are interpolated so that smoothness is prioritized in colors with a large degree of variation and reproduction accuracy is prioritized in colors with a small degree of variation. With this configuration, an average value of the color variation can be reflected in grid points added to the color conversion LUT, while leaving color characteristics specific to the printer 300b.

Then, in the present embodiment, when the data of accumulated calorimetric values increases, the degree of color variation is recalculated to recreate a printer profile, thereby allowing the creation of a printer profile more accurately reflecting an average value of color variation. Additionally, the printer 300b can always use a printer profile created by a correction/interpolation calculation method best at the point in time.

In addition, to the data of the colorimetric values accumulated in the hard disk 140 of the PC 100, there can be added various kinds of attribute information such as model information, individual product information, temperature information, humidity information, paper type information, and consumable component life information. For example, temperature information is added to the data of the colorimetric values, and based on the temperature information, the data of the colorimetric values are classified into three categories: "high temperature range", "medium temperature range", and "low temperature range". In addition, also to the colorimetric values of the color chart output from the printer 300b, there is added temperature information at the time of output of the color chart. Then, the PC 100 calculates a degree of color variation from the data of colorimetric values belonging to the same category as a category to which the temperature information added to the colorimetric values belongs, and creates a printer profile using a calculation formula according to the degree of the variation. This configuration allows the creation of a printer profile with higher accuracy.

Even when a third printer of the same model as the printers 300a and 300b is located on the network 400, the use of the data of the colorimetric values in the printer 300a similarly allows the creation of a printer profile reflecting an average value of variation per output of each color by causing the third printer to output one sheet of the color chart. Then, for example, when the data of colorimetric values of additional 10 sheets of the color chart is accumulated, a printer profile is recreated, thereby allowing the creation of a printer profile more accurately reflecting an average value of color variation.

As described above, the above embodiment has described the case of creation of a printer profile reflecting color variation per output in printer. The following is a description of a case of creation of a printer profile reflecting color variation per printer.

The creation of a printer profile reflecting color variation per printer uses data of colorimetric values accumulated by causing a plurality of printers to output color charts.

Specifically, for example, when creating a printer profile for an only one printer of a model C, first, 20 printers of a model B structurally similar to the model C are caused to output each one sheet of a color chart. Then, the degree of variation in each color is specified from data of colorimetric values per patch image. After that, the printer of the model C is caused to output one sheet of the color chart, and using a calculation formula according to the degree of the color variation, a printer profile is created. In this way, an average value of color variation per printer can be reflected in the printer profile, while leaving color characteristics specific to the model C. Additionally, in this case, weighting of approximate values or the like may be performed using, as an additional factor, a degree of structural similarity associated with color reproducibility in the models B and C.

As described above, by accumulating the data of the colorimetric value of each patch image regarding the plurality of sheets of the color chart output from the plurality of printers of the model B, there can be created a printer profile (for example, a manufacturer-provided profile) for all printers of the model C that reflects variation in individual differences of the similar model merely by causing the single printer of the model C to output one sheet of the color chart. Then, for example, when the data of colorimetric values regarding additional 10 printers of the model Bis accumulated, a printer profile is recreated, thereby allowing the creation of a printer profile more accurately reflecting an average value of color variation per printer.

Causes of the color variation seem to be individual difference between the printers, change due to replacement of parts, density fluctuation in engine (temperature and humidity, continuous operation time, etc.), random in-plane unevenness, and the like. Additionally, as for tendencies in color variation, colors near solid parts tend to vary in a small degree, whereas colors in a region ranging from a highlight part to a halftone part tend to vary in a large degree. Furthermore, monochromatic colors tend to vary in a small degree, whereas mixture colors of three colors: C, M, and Y tend to vary in a large degree.

The present invention is not limited only to the embodiments described above, and various modifications can be made within the scope of the claims.

For example, in the above-described embodiments, the printer profile has been recreated at the time when the data of colorimetric values has increased by the amount of the 10 sheets of the color chart. However, the timing for recreating a printer profile is not limited to the time when the data of colorimetric values has increased by the amount of 10 sheets of the color chart. For example, every time the data of colorimetric values increases by an amount of one sheet of the color chart, a printer profile may be recreated.

Additionally, in the above-described embodiments, after the correction process of the colorimetric values, the interpolation process of the grid points was performed. However, any one of the correction process and the interpolation process may be omitted, and for example, only the interpolation process can be executed without executing the correction process. Alternatively, after executing the correction process, a typical interpolation process unrelated to the degree of color variation may be executed.

Additionally, in the above-described embodiments, the color value of the grid point used for interpolation between the pair of grid points has been calculated as the weighted average value between the linear approximate value and the polynomial approximate value. However, the calculation of the weighted average value therebetween is not necessarily needed. The color value of grid point used for interpolation between a pair of grid points may be either the linear approximate value or the polynomial approximate value.

Additionally, in the above-described embodiments, the number of the grid points used for calculating the linear approximate value and the polynomial approximate value has been changed according to the degree of color variation. However, the number of grid points used therefor may be constant regardless of the degree of color variation.

Additionally, in the above-described embodiments, the number of the colorimetric values of the other patch images used for calculating the predicted approximate value of the colorimetric value has been changed according to the degree of color variation. However, the number of the other patch images may be constant regardless of the degree of color variation.

Additionally, in the above-described embodiments, the degrees of color variation in the patch images have been specified by calculating the standard deviations of the $L^*$ values, the $a^*$ values, and the $b^*$ values of the colorimetric values. However, the degrees of the color variation may be specified by calculating dispersions of the colorimetric values: $L^*$ values, $a^*$ values, and $b^*$ values or calculating differences between maximum and minimum values.

Additionally, in the above-described embodiments, in terms of facilitation of setting, a threshold value with respect to the sum of the standard deviations of the $L^*$ values, the $a^*$ values, and the $b^*$ values has been set and, based on the threshold value, the degree of variation has been classified into three levels: "a", "b", and "c". However, the standard deviations and the degree of variation may be correlated by a function. This configuration allows continuous change in the degree of variation.

Additionally, in the above-described embodiments, the degree of color variation has been classified into the three levels: "a", "b", and "c" from the standard deviations of the colorimetric values of the patch images, and the number of neighboring points and the weighting factor to be applied to the interpolation process have been determined from the degrees of both-side variation of three levels determined by combinations of the above three levels: "a", "b", and "c". However, the number of neighboring points and the weighting factor to be applied to the interpolation process may be directly determined from standard deviations (the degree of color variation) in each of two patch images. In this case, in terms of continuously changing the weighting factor, the standard deviations of the colorimetric values of the patch images and the weighting factor are preferably correlated by a function.

Additionally, in the above-described embodiments, the degree of color variation has been specified by comparing the sum of the standard deviations of the $L^*$ values, the $a^*$ values, and the $b^*$ values with an invariably constant threshold value. However, the threshold value may be dynamically changed by CMYK values. For example, in cases where K is less than 80, when the sum of the standard deviations is less than 1.0, the degree of variation is classified as "a". On the other hand, in cases where K is not less than 80, when the sum of the standard deviations is less than 1.5, the degree of variation is classified as "a".

Additionally, in the above-described embodiments, the plurality of printers have been caused to output the same color chart. However, the color chart to be output by a plurality of printers does not have to be the same and can be any color chart as long as the chart includes patch images with the same CMYK values.

Additionally, in the above-described embodiments, the $L^*a^*b^*$ color system has been used as a device-independent color space. However, the color system of the device-independent color space is not limited to the $L^*a^*b^*$ color system and may be an XYZ color system, CIECAM02, or the like.

Additionally, in the above-described embodiments, the colorimetry unit incorporated in the printers has colorimetrically measured the patch images. However, a colorimeter connected to the PC via an exclusive line may colorimetrically measure the patch images.

Additionally, in the above-described embodiments, the controllers have been provided separately from the printers. However, the controllers may be incorporated in the printers.

Additionally, in the above-described embodiments, the profiler as the profile creation program has been installed in the PC. However, the profiler may be installed in the controller.

Additionally, in the above-described embodiments, the data of the colorimetric values has been accumulated in the hard disk of the PC. However, the data of the colorimetric values may be accumulated in a cloud server on a network. In this case, the profiler may be stored in the cloud server on the network, and the server may create a printer profile. Alternatively, the cloud server on the network may execute only the process for calculating the degree of color variation or may execute the series of processes up to the determination of a correction/interpolation calculation method.

The units and the methods for performing the various kinds of processes in the print system according to each of the above-described embodiments can be embodied by either an exclusive hardware circuit or a programmed computer. The program may be provided, for example, by a computer readable recording medium such as a flexible disk or a CD-ROM, or may be provided online through a network such as the Internet. In this case, the program stored in the computer readable recording medium is usually transferred and stored into a storage unit such as a hard disk. In addition, the program may be provided as independent application software or may be incorporated, as one function of the print system, into software of the device.

What is claimed is:

1. A profile creation method for creating a color conversion profile for a printer by causing the printer to output a color chart including patch images having colors corresponding to combinations of values of a plurality of basic colors, the method comprising the steps of:
   (a1) acquiring colorimetric values of patch images included in a plurality of color chart sheets outputted from at least a first printer;
   (a2) acquiring colorimetric values of patch images in a color chart outputted from a second printer;
   (b) creating a color conversion profile for the second printer from the colorimetric values acquired at the step (a2) by using a calculation formula according to a degree of variation in a color of each patch image obtained from data of colorimetric values accumulated regarding the each patch image at step (a1); and
   (c) when an amount of color chart sheets outputted from the first printer increases by a predetermined amount, creating a new color conversion profile for the second printer from the colorimetric values acquired at the step (a2) by using a calculation formula according to the degree of the variation obtained from the color chart sheets after the increase.

2. The profile creation method as claimed in claim 1, further comprising the step of:
   (d) replacing the color conversion profile for the second printer created at the step (b) by the new color conversion profile for the second printer created at the step (c).

3. The profile creation method as claimed in claim 1, further comprising the step of:
   (e) when the amount of color chart sheets outputted from the first printer increases by a predetermined amount, comparing degrees of the variation before and after the increase to determine whether or not to execute the step (c).

4. The profile creation method as claimed in claim 1, wherein
   the calculation formula includes a calculation formula for correcting the colorimetric values acquired at the step (a2).

5. The profile creation method as claimed in claim 4, wherein
   the calculation formula is a calculation formula for calculating a weighted average value between a colorimetric value acquired at the step (a2) and a predicted approximate value calculated from colorimetric values of a plurality of other patch images included in the color chart; and
   a weighting factor for use in the calculation of the weighted average value is changed according to the degree of the variation so that as the degree of the variation is larger, a weight of the predicted approximate value becomes larger.

6. The profile creation method as claimed in claim 5, wherein
   a number of the other patch images is changed according to the degree of the variation so that as the degree of the variation is larger, the number of the other patch images increases.

7. The profile creation method as claimed in claim 1, wherein
   the calculation formula includes a calculation formula for interpolating grid points of a lookup table indicating a correspondence relationship between the values of the colors of the patch images and the colorimetric values of the patch images.

8. The profile creation method as claimed in claim 7, wherein
   the calculation formula is a calculation formula for performing an interpolation calculation using a plurality of grid points; and
   a number of the grid points for use in the interpolation calculation is changed according to the degree of the variation so that as the degree of the variation is larger, the number of the grid points increases.

9. The profile creation method as claimed in claim 7, wherein
   the calculation formula is a calculation formula for calculating a weighted average value between a linear approximate value calculated by a linear interpolation calculation using a plurality of grid points and a polynomial approximate value calculated by a polynomial interpolation calculation using the plurality of grid points; and
   a weighting factor for use in the calculation of the weighted average value is changed according to the degree of the variation so that as the degree of the variation is larger, a weight of the linear approximate value becomes larger.

10. The profile creation method as claimed in claim 1, further comprising the steps of:
    (f) calculating standard deviations of L* value, a* value, and b* value of the colorimetric value in an L*a*b* color system from the data of the colorimetric values; and
    (g) obtaining the degree of the variation on the basis of the standard deviations calculated at the step (f).

11. The profile creation method as claimed in claim 1, wherein
    the data of the colorimetric values is classified into a plurality of categories on the basis of specific attribute information;
    the attribute information is added to the colorimetric values acquired at the step (a2); and
    the degree of the variation is obtained from the data belonging to the same category as a category to which the attribute information added to the colorimetric values belongs.

12. The profile creation method as claimed in claim 1, wherein
    the data of the colorimetric values is accumulated in a cloud server on a network.

13. A non-transitory computer readable recording medium stored with a profile creation program for creating a color conversion profile for a printer by causing the printer to output a color chart including patch images having colors corresponding to combinations of values of a plurality of basic colors, the program causing a computer to execute a process comprising the steps of:
    (a1) acquiring colorimetric values of patch images included in a plurality of color chart sheets outputted from at least a first printer;
    (a2) acquiring colorimetric values of patch images in a color chart outputted from a second printer;
    (b) creating a color conversion profile for the second printer from the colorimetric values acquired at the step (a2) by using a calculation formula according to a degree of variation in a color of each patch image obtained from data of colorimetric values accumulated regarding the each patch image at step (a1); and
    (c) when an amount of color chart sheets outputted from the first printer increases by a predetermined amount, creating a new color conversion profile for the second printer from the colorimetric values acquired at the step (a2) by using a calculation formula according to the degree of the variation obtained from the color chart sheets after the increase.

14. The non-transitory computer readable recording medium as claimed in claim 13, wherein
    the color conversion profile for the second printer created at the step (b) is replaced by the new color conversion profile for the second printer created at the step (c).

15. The non-transitory computer readable recording medium as claimed in claim 13, wherein
    the process further comprises the step of:
    (d) when the amount of color chart sheets outputted from the first printer increases by a predetermined amount, comparing degrees of the variation before and after the increase to determine whether or not to execute the step (c).

16. The non-transitory computer readable recording medium as claimed in claim 13, wherein
    the calculation formula includes a calculation formula for correcting the colorimetric values acquired at the step (a2).

17. The non-transitory computer readable recording medium as claimed in claim 16, wherein
the calculation formula is a calculation formula for calculating a weighted average value between a colorimetric value acquired at the step (a2) and a predicted approximate value calculated from colorimetric values of a plurality of other patch images included in the color chart; and
a weighting factor for use in the calculation of the weighted average value is changed according to the degree of the variation so that as the degree of the variation is larger, a weight of the predicted approximate value becomes larger.

18. The non-transitory computer readable recording medium as claimed in claim 17, wherein
a number of the other patch images is changed according to the degree of the variation so that as the degree of the variation is larger, the number of the other patch images increases.

19. The non-transitory computer readable recording medium as claimed in claim 13, wherein
the calculation formula includes a calculation formula for interpolating grid points of a lookup table indicating a correspondence relationship between the values of the colors of the patch images and the colorimetric values of the patch images.

20. The non-transitory computer readable recording medium as claimed in claim 19, wherein
the calculation formula is a calculation formula for performing an interpolation calculation using a plurality of grid points; and
a number of the grid points for use in the interpolation calculation is changed according to the degree of the variation so that as the degree of the variation is larger, the number of the grid points increases.

21. The non-transitory computer readable recording medium as claimed in claim 19, wherein
the calculation formula is a calculation formula for calculating a weighted average value between a linear approximate value calculated by a linear interpolation calculation using a plurality of grid points and a polynomial approximate value calculated by a polynomial interpolation calculation using the plurality of grid points; and
a weighting factor for use in the calculation of the weighted average value is changed according to the degree of the variation so that as the degree of the variation is larger, a weight of the linear approximate value becomes larger.

22. The non-transitory computer readable recording medium as claimed in claim 13, wherein
the process further comprises the steps of:
(e) calculating standard deviations of L* value, a* value, and b* value of the colorimetric value in an L*a*b* color system from the data of the colorimetric values; and
(f) obtaining the degree of the variation on the basis of the standard deviations calculated at the step (e).

23. The non-transitory computer readable recording medium as claimed in claim 13, wherein
the data of the colorimetric values is classified into a plurality of categories on the basis of specific attribute information;
the attribute information is added to the colorimetric values acquired at the step (a2); and
the degree of the variation is obtained from the data belonging to the same category as a category to which the attribute information added to the colorimetric values belongs.

24. The non-transitory computer readable recording medium as claimed in claim 13, wherein
the data of the colorimetric values is accumulated in a cloud server on a network.

* * * * *